(No Model.)
J. L. HANSARD & G. W. TRIBBY.
DISTANCE INSTRUMENT.
No. 333,625. Patented Jan. 5, 1886.
Fig. 1.
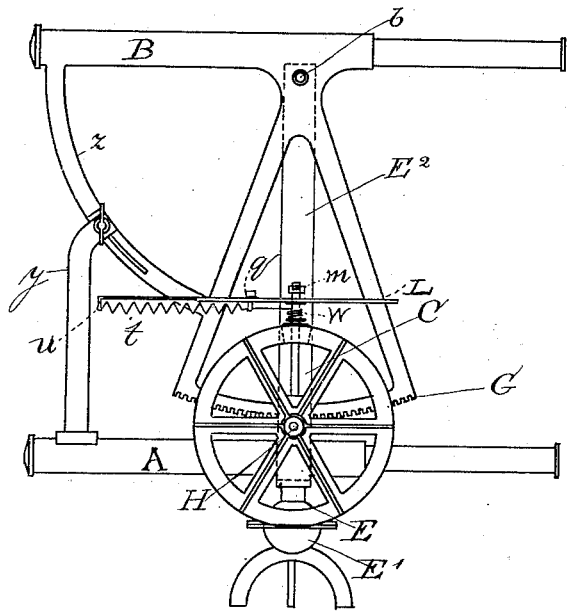
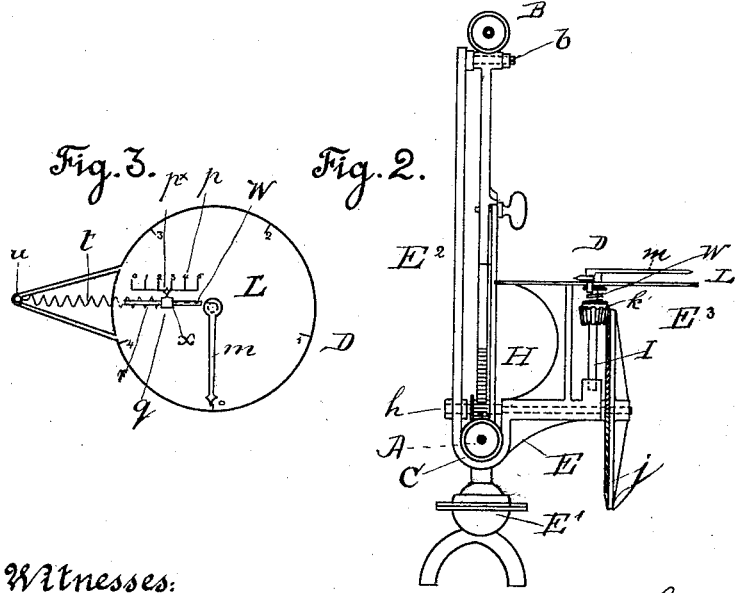
Fig. 3.  Fig. 2.
Witnesses:
S. A. Owen
B. J. Burns
Inventor:
Joseph Lafayette Hansard
George W Tribby
By his Att'y,
Alphonso B Smith

UNITED STATES PATENT OFFICE.

JOSEPH LAFAYETTE HANSARD AND GEORGE WASHINGTON TRIBBY, OF OROVILLE, CALIFORNIA.

DISTANCE-INSTRUMENT.

SPECIFICATION forming part of Letters Patent No. 333,625, dated January 5, 1886.

Application filed May 18, 1885. Serial No. 165,949. (No model.)

*To all whom it may concern:*

Be it known that we, JOSEPH LAFAYETTE HANSARD and GEORGE W. TRIBBY, citizens of the United States, residing in Oroville, county of Butte, and State of California, have invented certain new and useful Improvements in Instruments for Measuring Distances; and we do hereby declare that the following is a full, clear, and exact description of our said invention, reference being had to the accompanying drawings, that form a part of this specification.

Our invention relates to theodolites and such instruments of the kind for measuring distances and heights; and it consists in the construction and combination of parts and devices, as hereinafter fully explained and pointed out by which we produce and provide an instrument having many points of advantage and improvement over other devices and instruments heretofore made.

Referring to the said drawings by figures and letters, Figure 1 is a side elevation of the instrument constructed according to our invention. Fig. 2 is an end view taken from the back of the instrument, or from the left-hand side of Fig. 1. Fig. 3 is a top view of the indicator.

Our invention consists in arranging and combining two sight-tubes or telescopes, as A B, upon a common base or stand, C, in such manner that while the distance or space between them is fixed there is provided a means whereby one of these tubes is capable of moving or swinging upon a center to bring its line of sight into convergence with the line of sight through the other tube. Connected with the movable tube is an indicating device, D, by which the degree of movement given to the movable tube is shown upon a dial, the connecting mechanism and the divisions of the dial being both of such character and arrangement that the adjustment of the two sight-tubes upon a distant object will cause the indicating hand or pointer to give upon the dial the measurement of the distance.

These parts are combined and arranged for use and operation substantially as follows: The frame E is composed of a rest, C, in which the tube A is fixed, a perpendicular arm, $E^2$, which supports the tube B, and a bracket, $E^3$, to carry the dial and indicating mechanism. A ball-and-socket joint, E', connects the frame to the stand or base. The tube B is pivoted at $b$ to the arm $E^2$, on which point as a center it is movable in an arc, and to the tube is fixed a toothed segment, G, of suitable length to engage with a pinion, $h$, on the shaft H. This shaft is geared with an upright shaft or spindle, I, by the wheel and pinion $j$ $k$, and by its rotation it produces a movement of the tube B on its pivot. This movement is shown upon a dial, L, by a hand or pointer, $m$, carried on the end of the spindle I, and by suitable divisions on this dial the degree of the angular movement of the tube is indicated.

As the degree of the angle assumed by the two tubes for any given distance is readily determined, the dial can be marked and divided into such number of parts as will be necessary or convenient to show the various measurements between the two extreme portions that the movable tube is capable of taking. This indicating device may be of any suitable construction by which the number of revolutions of the shaft H can be shown; but we have shown and will describe a simple construction of parts from which any skilled workman will readily understand the manner of producing and applying an indicator suitable for the purpose required.

The two shafts are geared together by wheel and pinion of such size with reference to the dial that in the movement of the tube from the greatest to the least angle the pointer will make five revolutions around the dial. These revolutions are indicated on a scale, $p$, by a traveling pointer, $p^x$, carried on a slide, $q$, that works through a radial slot, $r$, in the face of the dial. Movement of the slide outward or toward zero end of the scale is effected by a coil-spring, $t$, fixed at a point, $u$, at one end and to the slide $q$ at the other end, and movement in the opposite direction along the scale is produced by a cord, W, that is fixed to the slide at one end, $x$, and is wound around the spindle above the pinion by the revolution of the spindle. By suitably dividing the scale $p$ it is evident the slide will show the revolution and parts thereof, if necessary, that are made by the pointer around the dial. These divisions of the scale, in connection with the division of the dial, will therefore show the position of the movable tube, and they can be made to indicate the distance between the station or point where the instrument is set and that point or object to which the lines of sight of the two tubes are caused to converge by the movement of the tube B. The angular position of the movable tube at such adjustment is obtained by turning the wheel $j$ by hand, and as this movement acts upon the spindle the indicators are moved accordingly along the scale. Such indicating device enables the linear distance to be read off when the two tubes are properly sighted to the distant object without the necessity of performing calculations.

The brace and arc Y Z are applied, as clearly shown in Fig. 1, to afford a means of steadying the movable sight-tube while taking observation and for locking it in position when properly sighted.

The operation of the instrument in obtaining the distance of a given point or object is as follows: Place the instrument in position; then sight the object with the lower telescope, which has its bearing in the ball-and-socket joint, so as to remain stationary with relation to the main frame; then lower the upper telescope until you can see the same object taken by the lower or stationary telescope. Both telescopes must take the same object, as set forth.

Having thus fully described our invention, what we claim, and desire to secure by Letters Patent, is—

1. An instrument for measuring distances, consisting of a lower telescope having a ball-and-socket joint in a supporting-frame, and an upper pivoted telescope having means for detachable attachment, and a segmental rack, a horizontal shaft having a pinion at one end engaging the said rack, and a gear at its opposite end engaging a pinion on a pointer-shaft to move the same over an indicating-dial, substantially as specified.

2. In an instrument for measuring distances, the dial L, having slot $r$, the bearing $u$, spring $t$, slide $q$, pinion-shaft I, carrying the pointer $m$, and the cord W, secured at one end to the said shaft and at its opposite end to the slide, the whole combined and adapted to operate substantially as specified.

3. The combination, with the movable tube B, of the spindle I, geared with the toothed segment G and provided with a pointer, $m$, the dial L, the slide $q$, adapted to move along the scale, and the spring $t$ for moving the slide in one direction and the cord W for moving it in the opposite direction, substantially as specified.

In testimony whereof we have hereunto set our hands and seals.

JOSEPH LAFAYETTE HANSARD. [L. S.]
GEORGE WASHINGTON TRIBBY. [L. S.]

Witnesses:
JOHN A. TOLAND,
STEPHEN MCNELLY.